US009223031B2

(12) United States Patent
Burr et al.

(10) Patent No.: US 9,223,031 B2
(45) Date of Patent: Dec. 29, 2015

(54) METHOD FOR TIMING-PICK-OFF OF UNDERSAMPLED PULSES FROM RADIATION DETECTORS USING A PHOTOSENSOR-BASED RADIATION DETECTION SYSTEM APPLYING A PROTOTYPE WAVEFORM AND A WEIGHTING FUNCTION

(75) Inventors: Kent Burr, Buffalo Grove, IL (US); Gin-Chung Wang, Grayslake, IL (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 131 days.

(21) Appl. No.: 13/343,541

(22) Filed: Jan. 4, 2012

(65) Prior Publication Data

US 2013/0168534 A1 Jul. 4, 2013

(51) Int. Cl.
*G01T 1/164* (2006.01)
(52) U.S. Cl.
CPC .................................. *G01T 1/1647* (2013.01)
(58) Field of Classification Search
CPC .................................................... G01T 1/1647
USPC ................ 250/208.1; 382/128, 130–132, 154
See application file for complete search history.

(56) References Cited

U.S. PATENT DOCUMENTS

| 2007/0106154 A1* | 5/2007 | Conti ............................ 600/436 |
| 2007/0114427 A1 | 5/2007 | Aoki |
| 2011/0155898 A1 | 6/2011 | Burr et al. |

FOREIGN PATENT DOCUMENTS

| JP | 2006-284546 A | 10/2006 |
| JP | 2011-137821 A | 7/2011 |

OTHER PUBLICATIONS

B. Joly et al., Test and Optimization of Timing Algorithms for PET Detectors with Digital Sampling Front-end, 2008, IEEE Nuclear Science Symposium Conference Record, pp. 4078-4085.*
A. Saoudi et al., Investigation of Depth-of-Interaction by Pulse Shape Discrimination in Multicrystal Detectors Read Out by Avalanche Photodiodes, Jun. 1999, IEEE Transactions of Nuclear Science, vol. 46, No. 3, pp. 462-467.*
U.S. Appl. No. 13/091,985, filed Apr. 21, 2011, Burr, et al.
U.S. Appl. No. 13/091,928, filed Apr. 21, 2011, Mann, et al.
U.S. Appl. No. 13/153,611, filed Jun. 6, 2011, Gagnon, et al.

(Continued)

*Primary Examiner* — Renee D Chavez
(74) *Attorney, Agent, or Firm* — Oblon, McClelland, Maier & Neustadt, L.L.P.

(57) ABSTRACT

A process and device for generating a prototype waveform and a weighting function. The process including obtaining waveforms generated by a detector having at least one photosensor, generating an initial estimate for the prototype waveform and the weighting function and parameterizing the prototype waveform and the weighting function and determining for each waveform an optimal amplitude and an optimal time offset of the prototype waveform. Included are steps of pairing waveforms based on the determined time offsets of the waveforms, calculating an arrival time difference for each pair of waveforms and determining a timing resolution value based on the calculated arrival time differences, determining whether the timing resolution value meets predetermined minimization criteria, and updating the set of parameters for the prototype waveform and the weighting function and repeating the determining, pairing, calculating, and determining, when the timing resolution value fails to meet the predetermined minimization criteria.

10 Claims, 10 Drawing Sheets

(56) References Cited

OTHER PUBLICATIONS

Jeffrey C. Lagarias, et al.; "Convergence Properties of the Nelder-Mead Simplex Method in Low Dimensions"; SIAM Journal of Optimization, Society for Industrial and Applied Mathematics; vol. 9, No. 1, pp. 112-147, 1998.

International Search Report issued Apr. 16, 2013, in PCT/JP2012/084193 with English translation of category of cited documents.

* cited by examiner

METHOD FOR TIMING-PICK-OFF OF UNDERSAMPLED PULSES FROM RADIATION DETECTORS USING A PHOTOSENSOR-BASED RADIATION DETECTION SYSTEM APPLYING A PROTOTYPE WAVEFORM AND A WEIGHTING FUNCTION

CROSS-REFERENCE TO RELATED APPLICATIONS

This application is related to the application entitled "Apparatus For Analog-To-Digital Conversion With A High Effective-Sample-Rate On The Leading Edge Of A Signal Pulse" (U.S. Pat. No. 8,866,654, issued October 21, 2014), the contents of which are incorporated herein by reference.

FIELD

The embodiments described herein relate generally to a system and a method of improving timing resolution for a PMT signal.

BACKGROUND

In PET imaging, or positron emission tomography, a radiopharmaceutical agent is administered, via injection, inhalation and/or ingestion, to a patient. The physical and bio-molecular properties of the agent then concentrate at specific locations in the human body. The actual spatial distribution, intensity of the point and/or region of accumulation, as well as the kinetics of the process from administration and capture to eventual elimination, all have clinical significance. During this process, the positron emitter attached to the radiopharmaceutical agent emits positrons according to the physical properties of the isotope, such as half-life, branching ratio, etc. Each positron interacts with an electron of the object, is annihilated and produces two gamma rays at 511 keV, which travel at substantially 180 degrees apart. The two gamma rays then cause a scintillation event at a scintillation crystal of the PET detector, which detects the gamma rays thereby. By detecting these two gamma rays, and drawing a line between their locations or "line-of-response," the likely location of the original annihilation is determined. While this process only identifies one line of possible interaction, accumulating a large number of these lines, and through a tomographic reconstruction process, the original distribution is estimated with useful accuracy. In addition to the location of the two scintillation events, if accurate timing—within a few hundred picoseconds—is available, time-of-flight calculations are also made in order to add more information regarding the likely position of the annihilation event along the line. Limitations in the timing resolution of a scanner determine the accuracy of the positioning along this line. Limitations in the determination of the location of the original scintillation events determine the ultimate spatial resolution of the scanner. A specific characteristic of the isotope (for example, energy of the positron) contributes (via positron range and co-linearity of the two gamma rays) to the determination of the spatial resolution for a specific radiopharmaceutical agent.

The above process is repeated for a large number of annihilation events. While every case needs to be analyzed to determine how many scintillation events are required to support the desired imaging tasks, conventionally a typical 100 cm long, FDG (fluoro-deoxyglucose) study accumulates about 100 million counts or events. The time required to accumulate this number of counts is determined by the injected dose, as well as the sensitivity and counting capacity of the scanner.

PET imaging relies on the conversion of gamma rays into light through fast and bright scintillation crystals, generating the scintillation events referred to above. Time-of-Flight (ToF) PET further requires sub-nanosecond timing resolution and resolutions of a few hundred picoseconds is also being contemplated. While it is complicated enough to tune and adjust two channels of scintillating crystal, photomultiplier tubes (PMT), and electronics, this complexity is only increased on a large arrays of crystals and sensors.

Modern PET systems support 500-600 ps timing resolutions.

Conventionally, arrival time determination of PMT output signals is difficult to achieve with significant accuracy because of the limitations of discrete elements. Moreover, with current ADC sample rate technology, only a small number of samples will fall within the leading edge of the PMT output signal, thus providing low-quality time stamp determination.

In addition, certain methods have been used to attempt to extract timing information from waveforms that are undersampled. For example, average functions for prototype functions and theoretically derived weighting or filter functions have been used. The average function is a close guess for the prototype function, but one significant problem is that the averaging process will invariably add blurring to the very leading edge of the pulse, where the most critical timing information is contained. The filter coefficients used in optimal filter approaches have been based on mathematical formulations which derive the weighting functions from the covariance matrix.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DETAILED DESCRIPTION

In one embodiment, there is described a photosensor-based radiation detection system that includes a detector having a plurality of photosensors therein, each photosensor being connected to analog-to-digital (ADC) circuitry, the ADC circuitry digitizing analog signals output by the photosensors to generate corresponding digital signals. Also included in the system is a processing unit that determines an arrival time and an amplitude of each of the digital signals by fitting the digital signals to a prototype waveform, the fitting including applying a weighting function that assigns varying importance to different times within the prototype waveform, with a leading edge of the digital signals being most heavily weighted. The prototype waveform and weighting function are determined by a generation procedure that includes parameterizing an initial prototype waveform and an initial weighting function, and optimizing the parameters via a calibration process.

In another embodiment, both the prototype waveform and the weighting function are determined empirically during the generation procedure.

In another embodiment, the weighting function varies depending on a sampling rate of the ADC circuitry and noise in the system.

In another embodiment, the prototype waveform is specific for a certain depth of interaction.

In another embodiment, the prototype waveform is specific for a certain crystal position.

In another embodiment, the prototype waveform is specific for a certain depth of interaction and a crystal position.

Further, in another embodiment, there is described a method of generating a prototype waveform and a weighting function. The method includes the steps of obtaining a plurality of waveforms generated by a detector having at least one photosensor, generating an initial estimate for the prototype waveform and the weighting function and parameterizing the prototype waveform and the weighting function with a set of parameters, and determining, for each of the obtained plurality of waveforms, a corresponding optimal amplitude and a corresponding optimal time offset of the prototype waveform. Also included in the method are the steps of pairing waveforms of the plurality of waveforms based on the determined time offsets of the plurality of waveforms, calculating an arrival time difference for each pair of waveforms and determining a timing resolution value based on the calculated arrival time differences, determining whether the determined timing resolution value meets predetermined minimization criteria, and updating the set of parameters for the prototype waveform and the weighting function and repeating the determining, pairing, calculating, and determining steps, when the timing resolution value fails to meet the predetermined minimization criteria.

In another embodiment, the step of determining the optimal amplitudes and time offsets further includes steps of generating, for a first waveform of the plurality of waveforms, an initial estimate of an initial amplitude and an initial time offset for the prototype waveform, interpolating, using the initial estimate of the initial time offset, to determine the prototype waveform and the weighting function on a timebase of the first waveform, and calculating a value of a penalty function using the generated initial estimate for the amplitude and the time offset, the first waveform, the determined prototype waveform, and the weighting function. Also included in the step of determining the optimal amplitudes and time offsets are the steps of determining whether penalty minimization criteria have been met based on a result of the calculation of the penalty function value, generating, for the first waveform, a new estimate for the amplitude and the time offset of the prototype waveform and repeating the interpolating, calculating, and determining steps, when it is determined in the determining step that the penalty minimization criteria have not been met, and outputting, for the first waveform, final values for the amplitude and the time offset of the prototype waveform.

In another embodiment, the method further includes the step of repeating the optimization of the prototype waveform and of the weighting function using each of the plurality of waveforms to generate the corresponding optimal time offset and optimal amplitude for each of the plurality of waveforms.

In another embodiment, optimization of the prototype waveform and of the weighting function is controlled by an external processor, while a fitting process of fitting an obtained waveform to the prototype waveform using the weighting function is performed on an FPGA and a new set of data is acquired and processed for each iteration of the fitting process.

Further, in another embodiment, there is described a device for generating a prototype waveform and a weighting function. The device includes an obtaining unit that obtains a plurality of waveforms generated by a detector having at least one photosensor, a generating unit that generates an initial estimate for the prototype waveform and the weighting function and parameterizing the prototype waveform and the weighting function with a set of parameters, and an optimal determining unit that determines, for each of the obtained plurality of waveforms, a corresponding optimal amplitude and a corresponding optimal time offset of the prototype waveform. Also included in the device is a pairing unit that pairs waveforms of the plurality of waveforms based on the determined time offsets of the plurality of waveforms, a calculating unit that calculates an arrival time difference for each pair of waveforms and determine a timing resolution value based on the calculated arrival time differences, a determining unit that determines whether the determined timing resolution value meets predetermined minimization criteria, and an updating unit that updates the set of parameters for the prototype waveform and the weighting function and that causes to be repeated the determining by the optimal determining unit, the pairing by the pairing unit, the calculating by the calculating unit, and the determining by the determining unit, when the timing resolution value fails to meet the predetermined minimization criteria.

In another embodiment, the determining by the optimal determining unit is performed by a second generating unit that generates, for a first waveform of the plurality of waveforms, an initial estimate for an initial amplitude and an initial time offset of the prototype waveform, an interpolating unit that interpolates, using the initial estimate of the initial time offset, to determine the prototype waveform and the weighting function on a timebase of the first waveform, a second calculating unit that calculates a value of a penalty function using the generated initial estimate for the amplitude and the time offset, that calculates the first waveform, using the determined prototype waveform, and that calculates the weighting function, a second determining unit that determines whether penalty minimization criteria have been met based on a result of the calculation of the penalty function value, a third generating unit that generates, for the first waveform, a new estimate for the amplitude and the time offset of the prototype waveform and causes to be repeated the interpolating by the interpolating unit, calculating by the second calculating unit, and determining in the second determining unit, when it is determined by the second determining unit that the penalty minimization criteria have not been met, and an outputting unit that outputs, for the first waveform, final values of the amplitude and the time offset for the prototype waveform.

Figure 1:
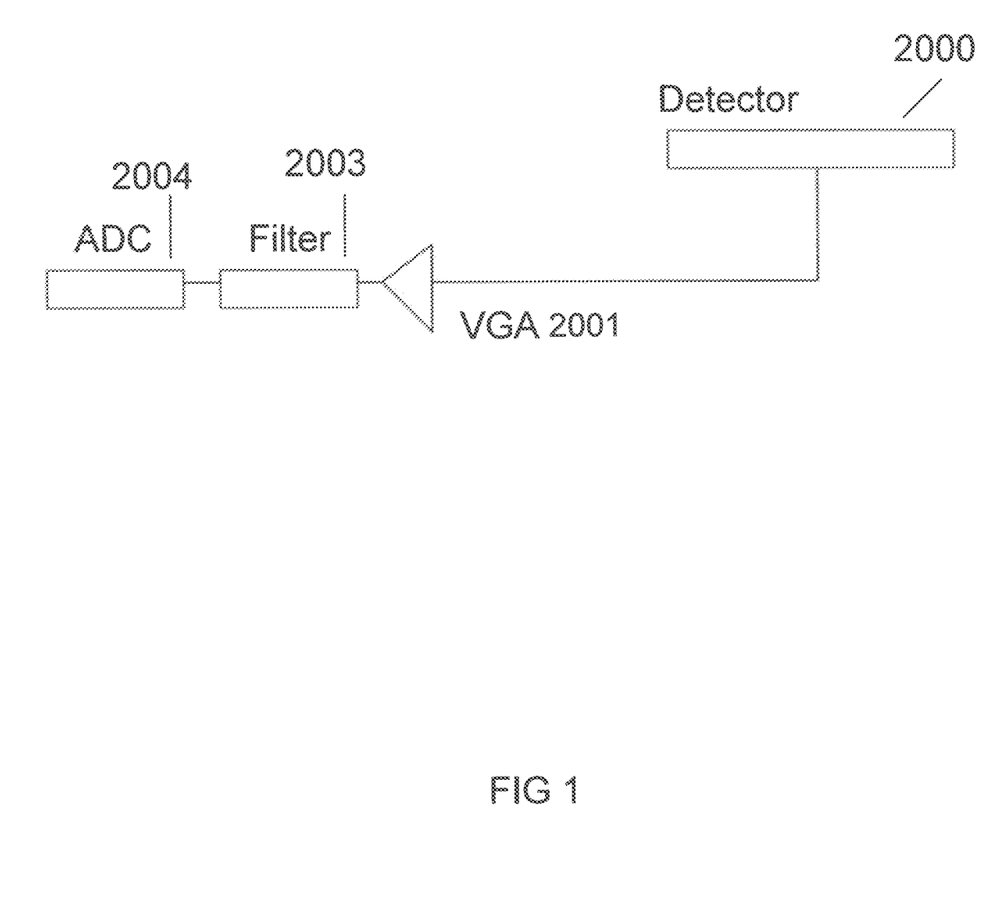
FIG. 1 illustrates an example of photosensor-based radiation detection system according to one embodiment.

Referring now to the drawings wherein like reference numbers designate identical or corresponding parts throughout the several views, FIG. 1 shows an analog output signal from a photosensor 2000, which could be a PMT, being sampled using a filter 2003, an amplifier (VGA) 2001 and an analog-to-digital converter (ADC) 2004. Information about an event can be obtained from sampled data gathered from multiple photosensors.

Figure 2:
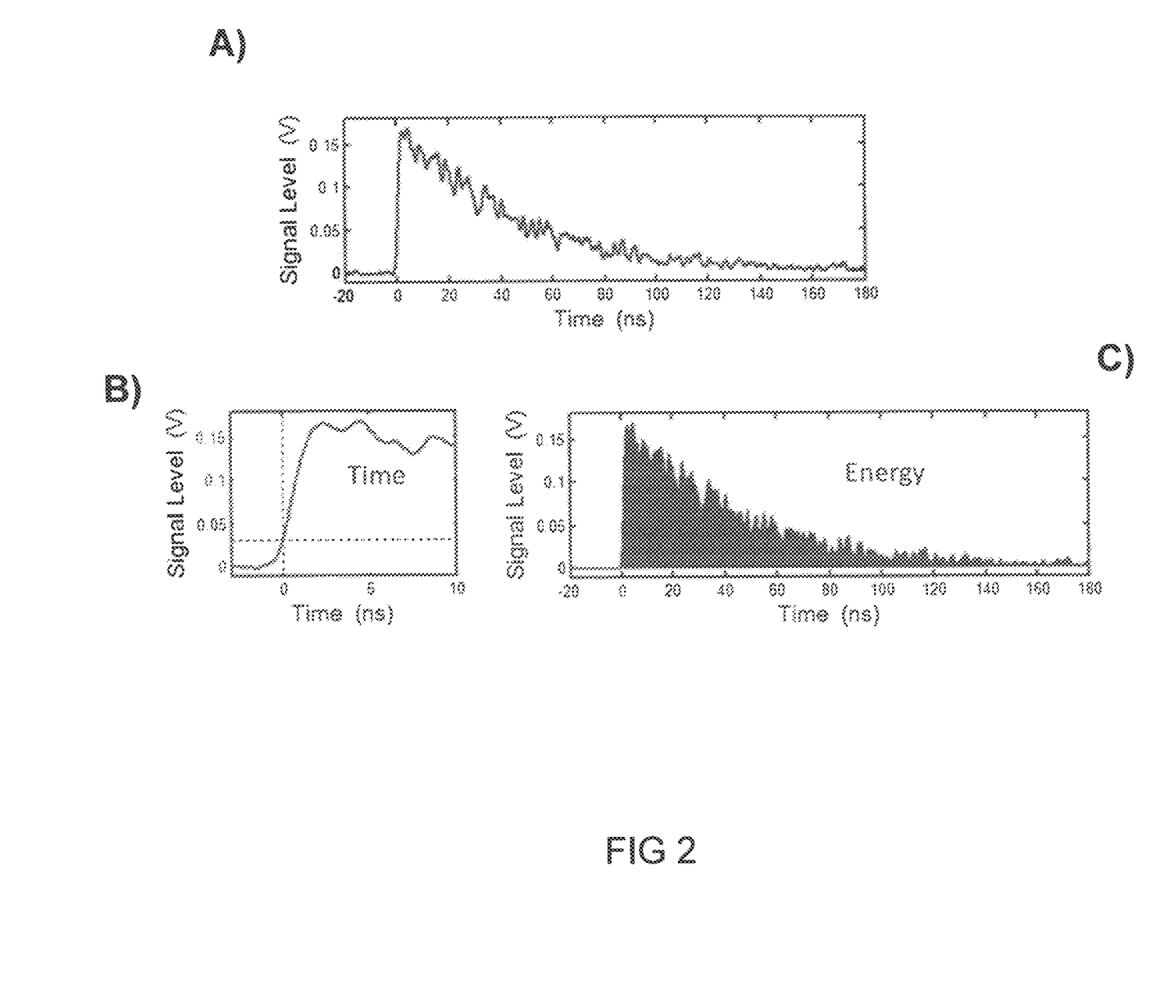
FIGS. 2(A)-(C) illustrate an example of an event sampled from an analog input signal.

FIGS. 2A-2C illustrate an example of an event sampled from an analog input signal. A plurality of photosensors, each like the photosensor 2000 shown in FIG. 1, detect scintillation light and output respective analog signals. An event is reflected in the analog photosensor output signal, which is input to an analog-to-digital converter to produce a digital signal, as shown in FIG. 2A. When analyzing the signal, the leading edge of the event is important, at least because the information in the leading edge can be used to extract event timing information, as shown in FIG. 2B. However, the entire signal is also important because the integral of the entire signal can be used to establish the energy of the event, as shown in FIG. 2C. The integral of the signal is also used, usually in combination with signals from other photosensors, to calculate the event position when traditional optical multiplexing approaches, such as so-called block detectors, are employed.

PET detectors, fast enough to support Time-of-Flight information, have the ability to perform an ultra-fast analysis of a response of one or more PMTs to the scintillation light. Typically, the leading edge of the response is used for timing information and the integral of the whole signal is used to establish the energy of the event, as shown in FIG. 2C. The characterization of the energy and timing is non-trivial as it is usually performed in a noisy background. Design of triggering and filtering of this type of signal requires specialized analog electronics designers and a costly development effort. This task is further complicated by the fact that PMTs have intrinsic variation in characteristics (gain, average transit time, and so on) that require that the circuitry be adaptable to several conditions.

The digital signals (or portion thereof) obtained from the analog signal can be processed, filtered, temporarily delayed, or stored without suffering signal distortion or degradation. As the signal representing the event is of a relatively high bandwidth, requirements on the sampling rate can be significant depending on how much of the signal needs to be captured. For instance, at least a 1 GHz sample rate is often needed to accommodate faster scintillator crystals. Moreover, at least an 8-bit ADC is often needed to accommodate the crystals. A 4 GHz, 12-bit capable ADC with the other components of the detector is able to offer an excellent sub-system with enhanced features. However, it is often the case that high speed ADC's are not available.

The present embodiment illustrates how, under certain conditions, the quality of the information derived from an undersampled signal can be improved. This improvement is achieved by the use of additional processing on the sampled signals and results in the extraction of a better timing estimate.

The additional processing can be applied to signals obtained from a single scintillator crystal coupled to a single photosensor (PMT, for example). The additional processing can also be applied to signals obtained from an array of scintillator crystals coupled to multiple PMTs (as often used in PET scanners). In addition, the additional processing can be applied to a composite signal from multiple PMTs, which is created by summing in the analog domain prior to sampling, or the processing can be applied to a composite signal that is created in the digital domain by summing multiple sampled PMT signals.

When forming the composite signal from multiple sampled signals, the composite signal can be generated using fixed relative delays between the signals from each photosensor for all events, or the composite signal can be generated using delays that depend on the crystal-of-interaction. An example of generating delays that depend on the crystal-of-interaction is described in U.S. patent application Ser. No. 12/649,159 to Burr and Gagnon, the contents of which are incorporated herein by reference.

In order to extract time information from an undersampled waveform, the waveform can be fit to a prototype waveform. The present embodiment describes the process for obtaining the prototype waveform and a weighing function, and the process for obtaining time information from the fitting of the undersampled waveform to the prototype waveform.

As mentioned above, one problem with using an average function to obtain a prototype function is that the averaging process will invariably add blurring to the very leading edge of the pulse, where the most critical timing information is contained. The present embodiment determines the prototype and weighting functions empirically, which provides superior timing resolution.

As an initial estimate of the prototype function, the average function can be used, and the optimum prototype function is then found by iteratively varying the prototype function, calculating the timing resolution, and finding the prototype function that minimizes the width (or maximizes the amplitude) of the timing distribution.

Similarly, an initial guess is made for the weighting function, such as a Gaussian centered near the beginning of the leading edge, and then the weighting function is also, simultaneously with the prototype function, optimized to give the best timing resolution. The initial estimate for the prototype function does not have to be the average function. Instead, the average function is merely a reasonable choice for the initial prototype function. The closer the initial estimate is to the true or final value, the faster the optimization process can be achieved.

Figure 3:
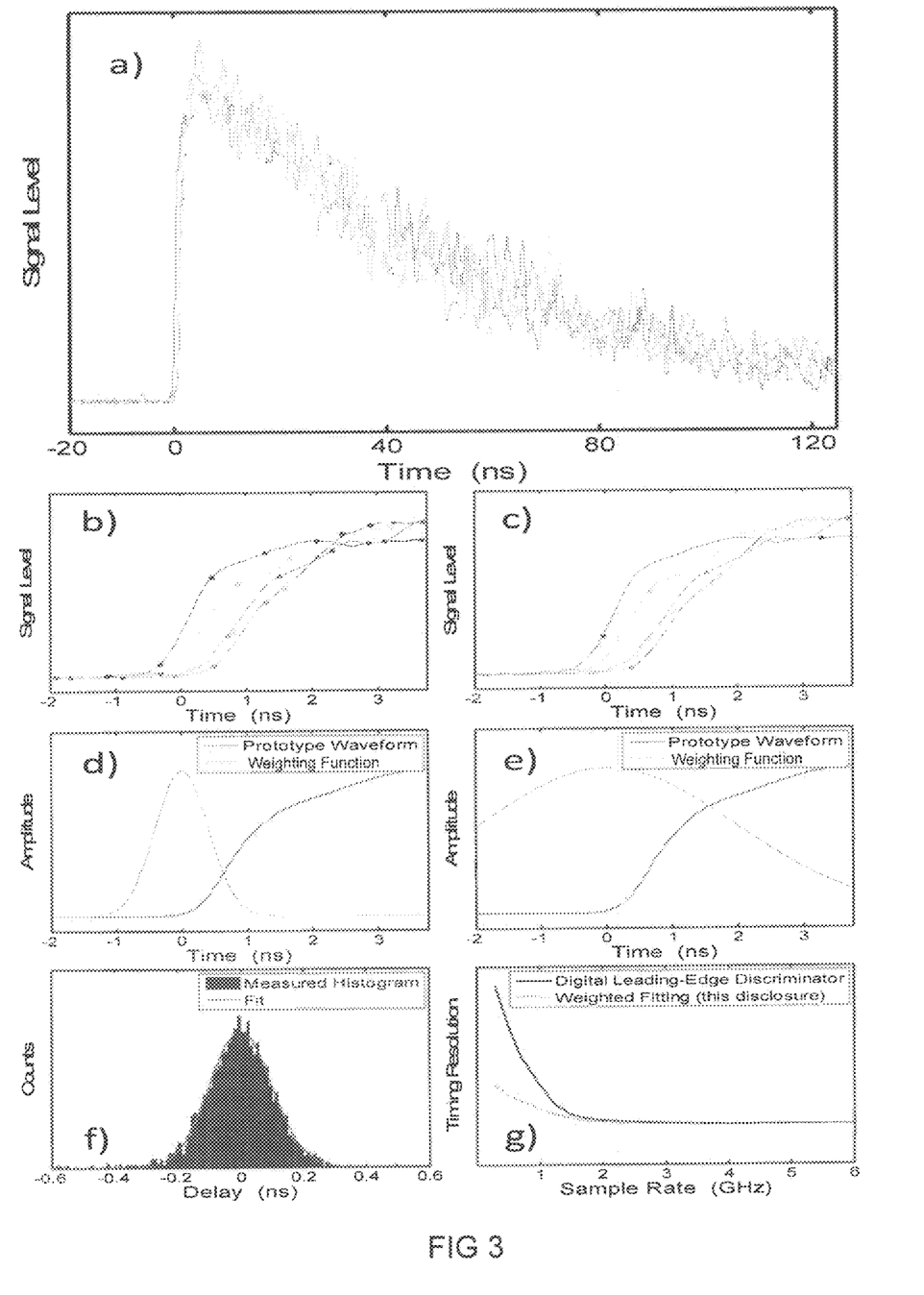
FIG. 3(A) illustrates an exemplary waveform generated by photodetector such as a LYSO-based detector.
FIGS. 3(B) and 3(C) illustrate the leading edges of waveforms sampled at 1.25 GHz and 300 MHz, respectively.
FIGS. 3(D) and 3(E) illustrate an exemplary prototype waveform and respective weighting functions that have been determined for signals sampled at 1.25 GHz and 300 MHz.
FIG. 3(F) illustrates a coincidence timing spectrum from two detectors.
FIG. 3(G) illustrates an improvement of one embodiment over an implementation of a digital leading-edge discriminator.

Once the prototype waveform is determined, each undersampled waveform is fit to a prototype waveform, and a varying relative weight, determined from the weighting function, is applied to different regions of the waveform. Both the prototype waveform and the weighting function are parameterized, with the parameters optimized during a calibration process. The optimum weighting function depends on factors including the prototype waveform shape, the statistical noise in the waveforms, and the sampling rate. Generally, as the sample rate is reduced (i.e., the data is more undersampled) the weighting function becomes wider (i.e., more weight is put on points that are not near the leading edge). Much of the information about the event is found in the leading edge of the event. FIGS. 3B and 3C show the leading edges of waveforms sampled at 1.25 GHz and 300 MHz, respectively. As can be seen in FIG. 3C, important information regarding the event found in the leading edge is missing in the waveforms sampled at 300 MHz.

Figure 4:
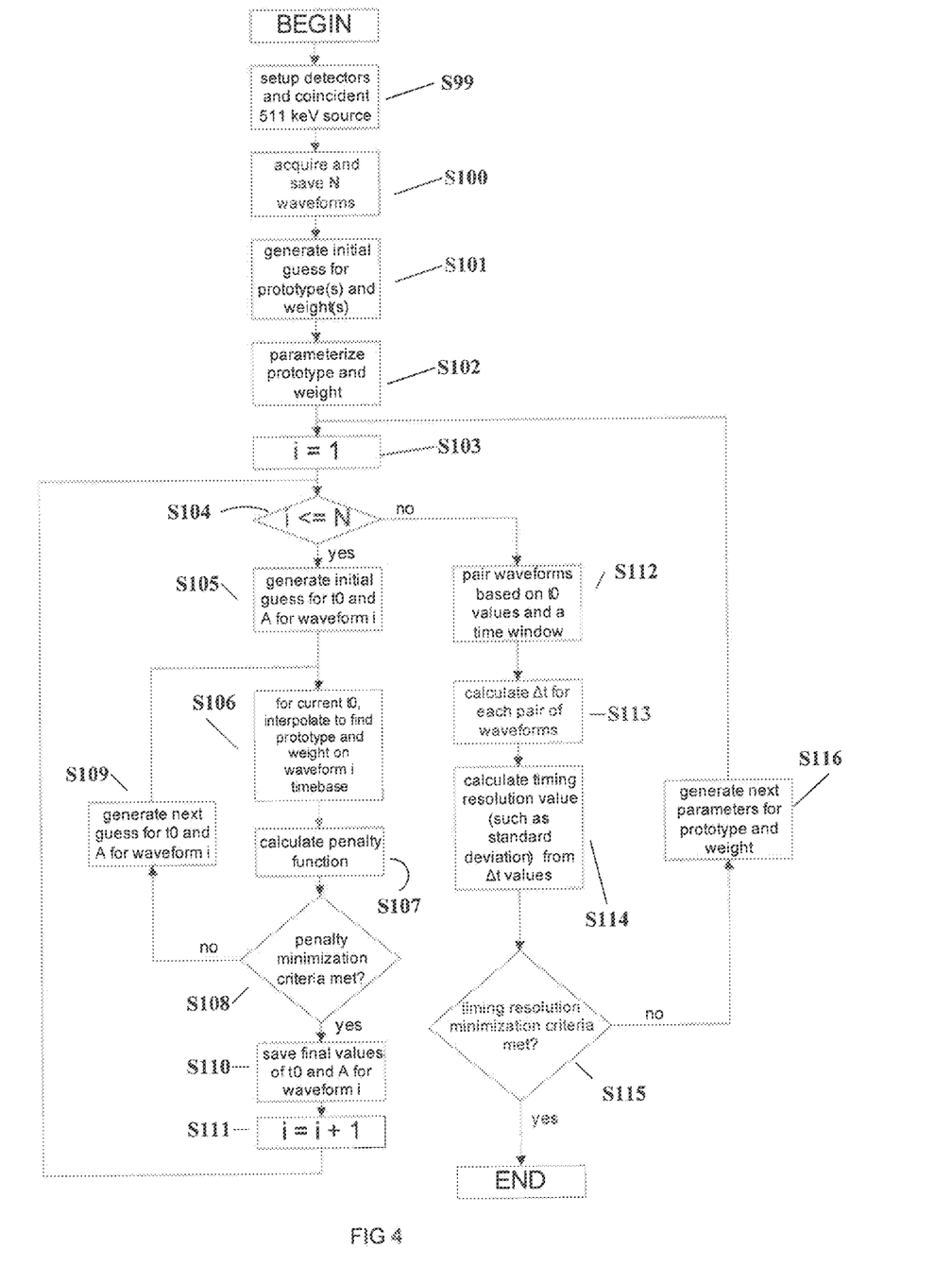
FIG. 4 illustrates a procedure for finding a prototype waveform and weighting function.

FIG. 4 illustrates the calibration process used to find a prototype function and a weighting function. The following process applies to the case of detectors consisting of a single scintillator crystal on a single photosensor. However, the process can be used even when detectors include multiple scintillator crystals and/or multiple photosensors.

In step S99, two or more detectors are arranged with a source of 511 keV gamma rays ($^{68}$Ge or $^{22}$Na, for example) between the detectors. In step S100, a large number of waveforms N, for example 1000 or more, (which may be paired as pairs of coincident waveforms) are acquired and stored in a computer-readable medium.

FIG. 3A shows an exemplary waveform generated by a photodetector such as a LYSO-based detector. As is illustrated in FIG. 3A, the photodetectors used in the PET process output a large number of waveforms N that each track an event.

In step S101, an initial estimate for prototype(s) and weight(s) are generated. This process includes, for example, a digital leading edge discriminator or constant-fraction discriminator being used to estimate t0 for each waveform. This estimate includes the process of, for example, defining t0 as the time at which the prototype waveform reaches 5% or 10% of its peak value. The waveforms for each detector are then aligned, and are, for example, averaged to get a preliminary prototype waveform for each detector. Other methods can be used also to generate a preliminary prototype waveform. The initial estimate of weighting function is then generated. Moreover, the initial estimate of the weighting function can be, for example, a Gaussian, centered at the defined t0, with a full width at half maximum (FWHM) equal to 3 times the sample period.

In step S102, the prototype waveform is parameterized. The parameterization includes, for example, parameterizing the value of the prototype function at several fixed times.

The parameters of the prototype waveform can be, for example, the function value at a number of points in time. Then the function values at other times, between the points in time at which the function value is specified, can be determined from interpolation using a piece-wise continuous Hermite polynomial or spline, for example.

Figure 5:
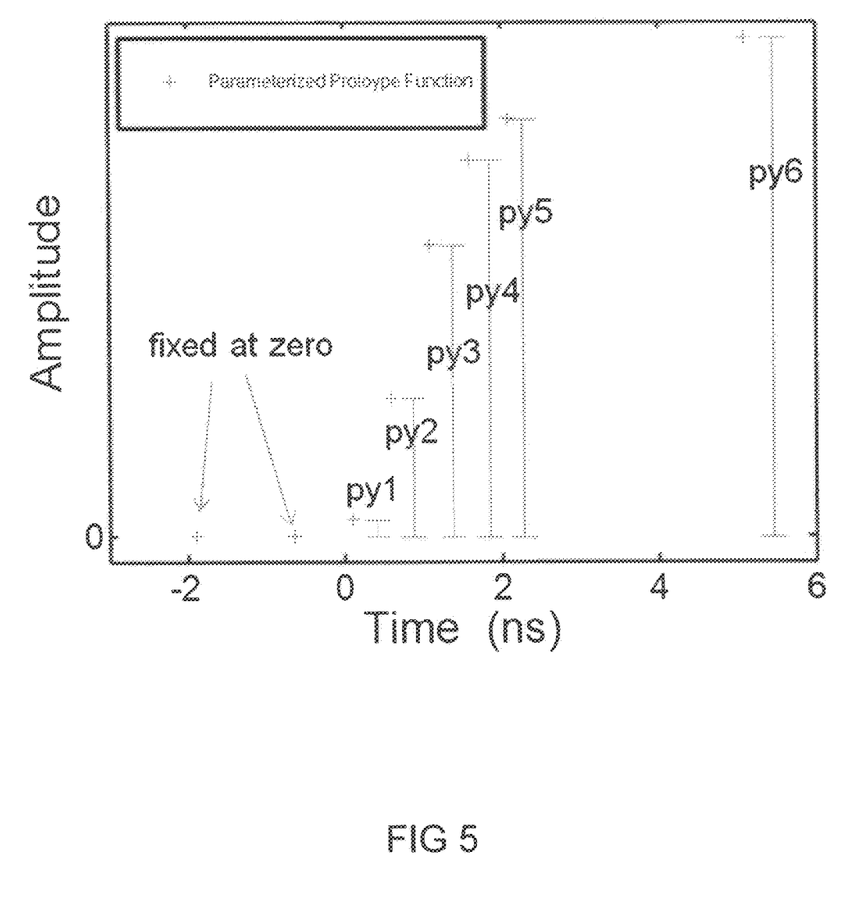
FIG. 5 illustrates one example of a way to parameterize the prototype function.

One example of how the prototype function can be parameterized is shown in FIG. 5. In the case shown in FIG. 5, there are six parameters corresponding to the respective values of the function at six points in time on the leading edge of the pulse. There are also two times prior to the leading edge where the value of the function is fixed at zero. Values near the leading edge are useful because the optimized weighting function will only apply significant weight to points near the leading edge.

Further in step S102, the weighting function is parameterized using, for example, a center position and the FWHM.

Figure 6:
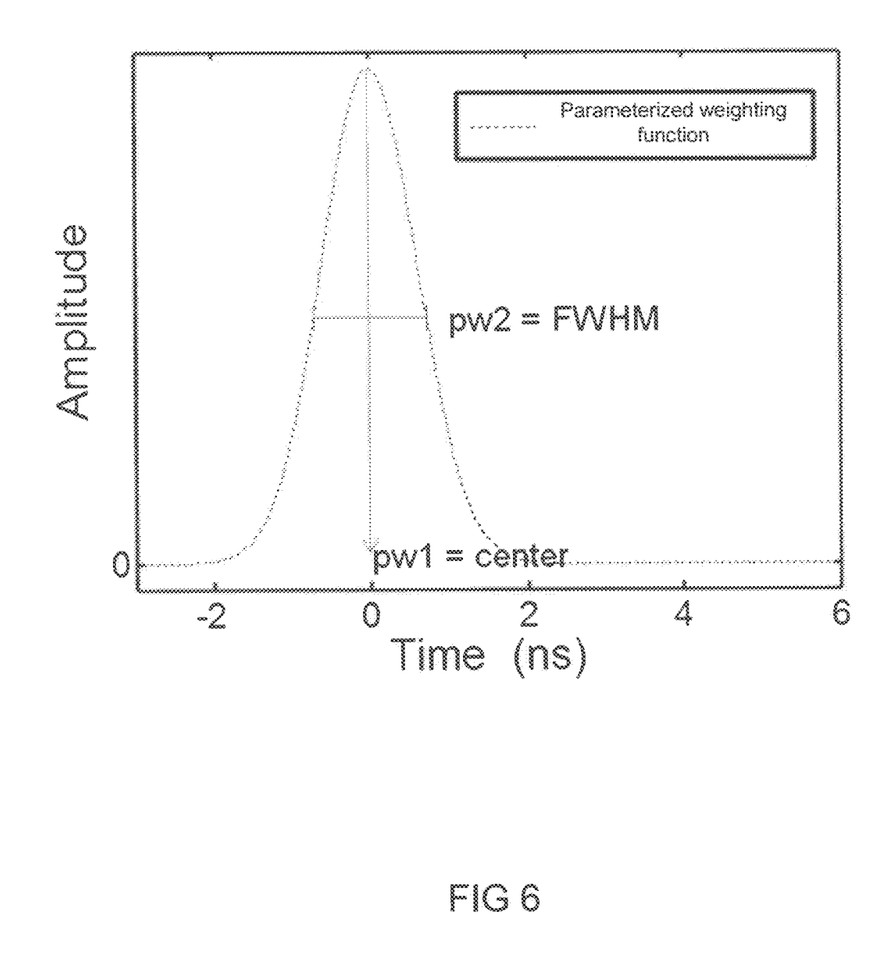
FIG. 6 illustrates one example of a way to parameterize the weighting function.

One example of how the weighting function can be parameterized is shown in FIG. 6. In this case, the weighting function is a Gaussian and there are two parameters, corresponding to center of the Gaussian and the width of the Gaussian. The absolute amplitude of the weighting function does not matter (only the relative weighting of each point matters) due to the normalization factor in a denominator of a penalty function, which is discussed below.

Step S103 begins the iterative process for processing the parameters used for the prototype and weight. In step S103, a counter value "i" is initiated to 1.

In step S104, when "i" is less than or equal to N, the process flows to step S105. Otherwise, when "i" is not less than or equal to N, the process flows to step S112.

In step S105, an initial estimate for the amplitude A and the time offset t0 is generated for each waveform "i". The initial estimate can be obtained once and saved. For example, A can come from an integral of the current waveform relative to the integral of the average waveform, and t0 can come from the digital leading edge discriminator. The amplitude A can be used to estimate the energy of the event, or the energy could be determined by numerical integration (in which case the amplitude A is simply discarded).

For the current guess of t0, in step S106, interpolation is performed for the prototype function to identify values of the prototype function that are on the same time points (timebase) as the current waveform, and a weighting function is calculated for each sample in the time points (timebase) of the current waveform.

In step S107, a penalty function is calculated for this A and t0 taking to account the values of the prototype function that are on the same timebase as the current waveform and the weighting function calculated for each sample in the timebase of the current waveform.

For example, the calculation could be performed by minimizing the following (least-squares) penalty function $$\text{penalty}(t_0, A) = \frac{\sum_i [w(t_i - t_0, pw1, pw2, \ldots) \cdot (A \cdot yp(t_i - t_0, py1, py2, \ldots) - y(t_i))]^2}{\sum_i [w(t_i - t_0, pw1, pw2, \ldots)]^2}$$

where $t_i$ are the sample times, $w(t, pw1, pw2 \ldots)$ is the weighting function (with parameters pw1, pw2, ...), $yp(t, py1, py2, \ldots)$ is the prototype waveform (with parameters py1, py2, ...), and $y(t_i)$ is the sampled waveform. Other penalty functions could be defined (for example, a least-square penalty function is not required).

In step S108 it is determined whether the penalty minimization criteria have been met. For each sampled waveform, the $t_0$ (time offset) and A (amplitude) which minimizes the penalty function is determined. Many algorithms for obtaining a minimization of the penalty function can be used.

These algorithms generally include criteria for determining the next parameter values to be tested, based on results from prior steps, and factors for terminating the minimization process or determining that the penalty minimization criteria have been met. The factors for terminating the minimization procedure can include, for example, (a) a determination regarding whether the change in the penalty function from step to step is varying by less than a pre-determined threshold, (b) a determination regarding whether the step size calculated according to the specific minimization algorithm is less than a pre-determined minimum step size, (c) a determination as to whether the number of iteration (or steps) has exceeded a pre-determined value, or (d) some other factor.

An example of one way to determine whether the penalty minimization criteria have been met is to use MATLAB™. For example, the FMINSEARCH function of MATLAB™ can be used to perform the determination. FMINSEARCH uses the Nelder-Mead simplex algorithm of the simplex search method of Lagarias, J. C., J. A. Reeds, M. H. Wright, and P. E. Wright, "Convergence Properties of the Nelder-Mead Simplex Method in Low Dimensions," *SIAM Journal of Optimization*, Vol. 9 Number 1, pp. 112-147, 1998 (incorporated herein by reference). This is a direct search method that does not use numerical or analytic gradients.

Defining x as a vector containing the parameters to be optimized, if n is the length of x, a simplex in n-dimensional space is characterized by the n+1 distinct vectors that are its vertices. In two-space, a simplex is a triangle; in three-space, it is a pyramid. At each step of the search, a new point in or near the current simplex is generated. The function value at the new point is compared with the function's values at the vertices of the simplex and, usually, one of the vertices is replaced by the new point, giving a new simplex. This step is repeated until the diameter of the simplex is less than the specified tolerance.

This algorithm uses a simplex of n+1 points for n-dimensional vectors x. The algorithm first makes a simplex around the initial guess $x_0$ by adding 5% of each component $x_0(i)$ to $x_0$, and using these n vectors as elements of the simplex in addition to $x_0$. (It uses 0.00025 as component i if $x_0(i)=0$.) Then, the algorithm modifies the simplex repeatedly according to the following procedure:

1. Let x(i) denote the list of points in the current simplex, i = 1,...,n+1.
2. Order the points in the simplex from lowest function value f(x(1)) to highest f(x(n+1)).
   At each step in the iteration, the algorithm discards the current worst point x(n+1), and accepts another point into the simplex. [Or, in the case of step 7 below, it changes all n points with values above f(x(1))].
3. Generate the reflected point
   r = 2m − x(n+1),
   where
   m = Σx(i)/n, i = 1...n,
   and calculate f(r).
4. If f(x(1)) ≤ f(r) < f(n)), accept r and terminate this iteration. Reflect
5. If f(r) < f(x(1)), calculate the expansion point s
   s = m + 2(m − x(n+1)),
   and calculate f(s).
   a. If f(s) < f(r), accept s and terminate the iteration (Expand).
   b. Otherwise, accept r and terminate the iteration (Reflect).
6. If f(r) ≥ f(x(n)), perform a contraction between m and the better of x(n+1) and r:
   a. If f(r) < f(x(n+1)) (i.e., r is better than x(n+1)), calculate c = m + (r − m)/2
   and calculate f(c). If f(c) < f(r), accept c and terminate the iteration (contract outside).
Otherwise, continue with Step 7 (Shrink).
   b. If f(r) ≥ f(x(n+1)), calculate
   cc = m + (x(n+1) − m)/2
   and calculate f(cc). If f(cc) < f(x(n+1)), accept cc and terminate the iteration (contract inside). Otherwise, continue with Step 7 (shrink).
7. Calculate the n points
   v(i) = x(1) + (x(i) − x(1))/2
   and calculate f(v(i)), i = 2,...,n+1. The simplex at the next iteration is x(1), v(2),...,v(n+1) (shrink).

When the penalty minimization criteria have been met in step S108, the process proceeds to step S110, otherwise, the process proceeds to step S109.

In step S109, a new estimate is generated for t0 and A for waveform "i", as discussed above. The process then returns to step S106 in which interpolation is performed for the new t0.

Once the penalty minimization criteria have been met in step S108, the process proceeds to step S110.

In step S110, the final values of t0 and A for waveform "i" that minimize the penalty function for this waveform are saved.

In step S111, the counter is incremented and the process returns to step S104 when the next waveform is processed by proceeding through steps S105-S111.

Once the counter value "i" is greater than N in step S104, the process proceeds to step S112.

In step S112, the waveforms are paired based on t0 values and a predetermined coincident time window.

Once the waveforms are paired, in step S113, t01 (first waveform in the pair) and t02 (second waveform in pair) are used to estimate Δt for the pair of waveforms, where $\Delta t = t_{01} - t_{02}$.

In step, S114, a timing resolution value (such as the standard deviation of a histogram of Δt values) is calculated from the Δt values. For instance, for each coincident pair of events, a time difference, $\Delta t = t_{01} - t_{02}$, is determined and a histogram of the Δt values for all coincident pairs is generated. For instance, FIG. 3F shows a coincidence timing spectrum from two detectors. During the calibration process, the parameters describing the prototype waveform and weighting function are tuned to optimize the timing spectrum (e.g., maximize the peak amplitude or minimize the width).

In step S115, it is determined whether the timing resolution minimization criteria have been met. If the timing resolution minimization criteria have not been met, the process proceeds to step S116, otherwise the process ends and the prototype function and the weighting function are determined. As a result of this calibration procedure, the width of the time difference distribution is minimized (or the peak amplitude of the distribution is maximized).

If the process proceeds to step S116, a new set of parameters for the prototype function and the weight are determined thus resulting in the above-described iteration being performed over the parameters (i.e. varying parameters) until the parameters that minimize the standard deviation of Δt or another measure of distribution width are found. For example, looking at FIGS. 5 and 6, py1-py6 and pw1-pw2 are varied until the width of the timing distribution is minimized. Various minimization algorithms, such as the simplex method described above, can be used to implement steps S115 and S116.

Once the next parameters are generated in step S116, the process returns to step S103 and the process of steps S103-S115 is repeated again.

FIGS. 3D and 3E show exemplary prototype waveforms and respective weighting functions that have been determined for signals sampled at 1.25 GHz and 300 MHz.

Figure 9:
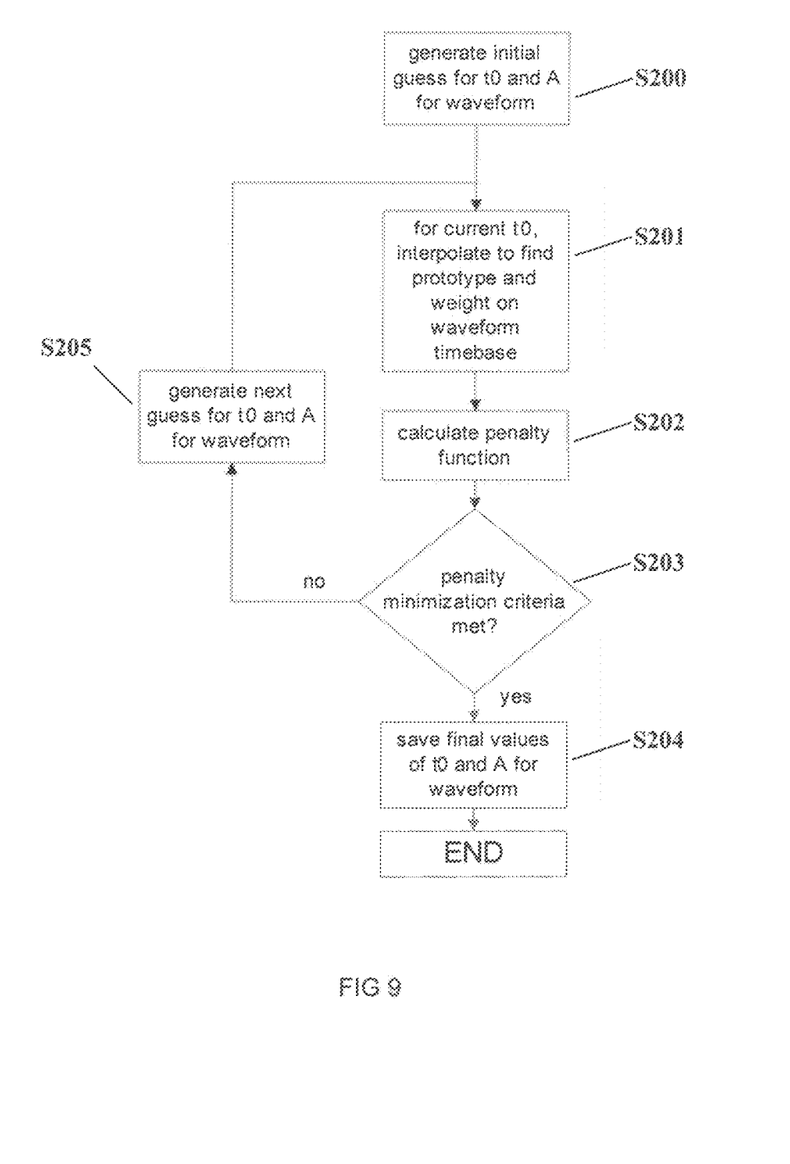
FIG. 9 illustrates a procedure for fitting a waveform to the prototype waveform using the weighting function.

FIG. 9 illustrates a procedure to process a measured waveform corresponding to a single event using a fixed prototype function and weighting function. This process is similar to steps S105-S109 shown in FIG. 4. The fitting process shown in FIG. 9 is performed once the prototype waveform and weighting function are determined.

For the fitting process performed on each waveform, generally an initial estimate for $t_0$ and A will be required. An initial estimate for $t_0$ can be made by applying a digital leading-edge or constant-fraction discriminator to the pulse [y(ti)]. An initial guess for the amplitude A, can be made by taking the ratio of the integral of the y(ti) to the integral of yp (or to the integral of the average pulse). As an alternative, A can be pre-determined based on the integral, and then its value fixed so that only t0 is determined by fitting. Many variations are possible.

The purpose of fitting is to find the t0 and amplitude A of the prototype function that gives the best fit (using the weighting function) to the measured data. Since the ADC sample clock can be derived by up-sampling the system clock through a PLL, the t0 can always be known relative to the system clock. Then, by applying the usual PET timing calibrations (i.e., crystal dependent), the actual gamma ray arrival time can be determined.

Figure 7:
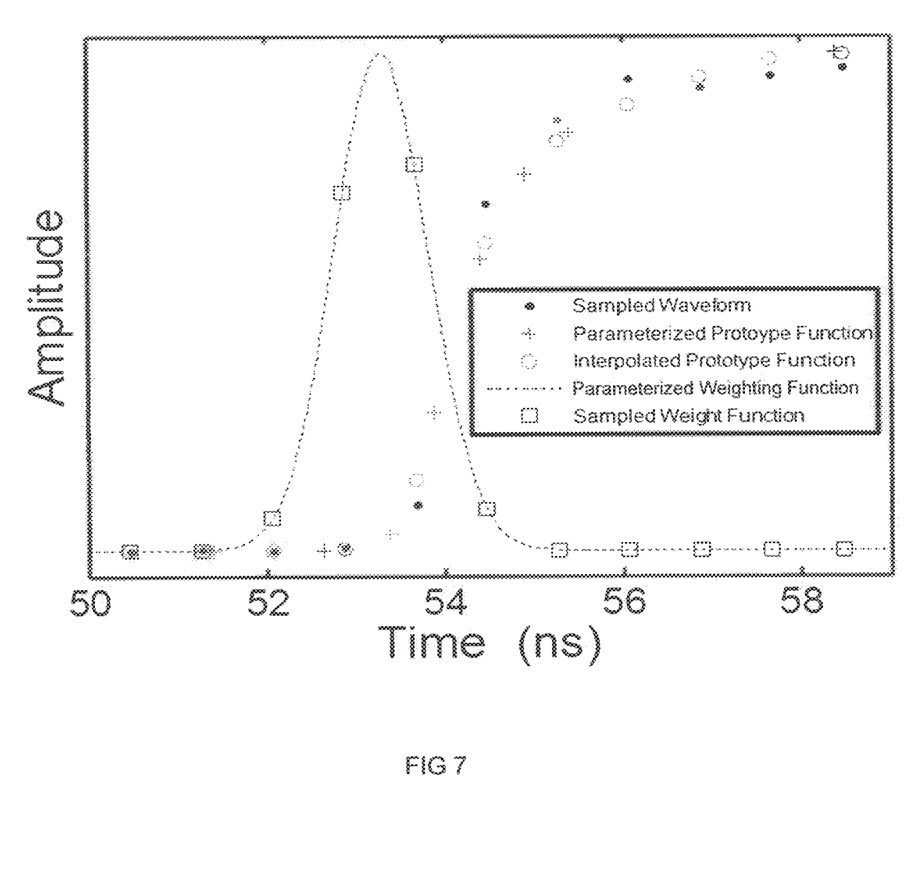
FIG. 7 illustrates an example of functions based on the initial guess for t0 and A.

In particular, in step S200, an initial guess for A and t0 for the measured waveform is determined (A can come from the integral of the measured waveform relative to integral of an average waveform and t0 can come from a digital LED). FIG. 7 illustrates an example of the functions after the initial estimate. Notice that the prototype function is interpolated to find the values on the same timebase as the sampled waveform. Likewise, the value of the weighting function is calculated for each sampled point in the sampled waveform.

In step S201, after determining t0, interpolation is performed to find values of prototype function on the same timebase as the current measured waveform. In addition, a weighting function is calculated for each sample in the timebase of the current waveform.

In step S202, a penalty function is calculated for the current A and t0.

In step S203 it is determined whether the penalty minimization criteria have been met. If not, the process proceeds to step S205, which generates a next estimate for t0 and A for the waveform. Again, various minimization algorithms can be used to implement steps S203 and S205. The process then returns to step S201, so that this process results in an iteration to optimize A and t0 (by minimizing the penalty function).

Figure 8:
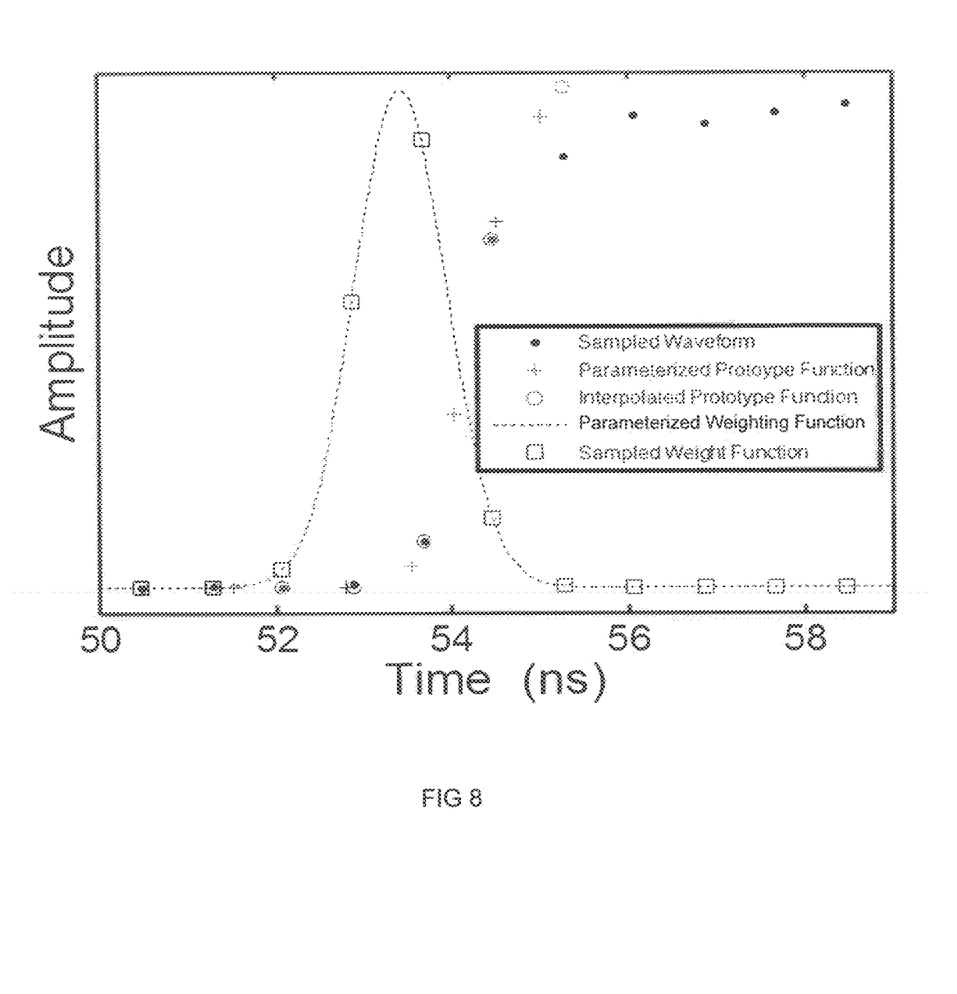
FIG. 8 illustrates an example of the best weighted fit for the same sampled waveform shown in FIG. 7.

FIG. 8 illustrates an example of a finalized best weighted fit (for the same sampled waveform as shown in FIG. 7.) Notice that the weighting function results in the initial portion of the leading edge being fit very well by the prototype function, but at later times, when the relative weighting function is much lower, the fit between the prototype function does not fit the sampled data as well. Most of the timing information is included in the samples near the leading edge.

Once the penalty minimization criteria are met in step S203, t0 is assigned as the arrival time in step S204.

As a result of the determination of the prototype and weighting function, a higher timing resolution can be obtained. For instance, FIG. 3G shows the improvement of the present embodiment over an implementation of a digital leading-edge discriminator.

The procedures shown in FIGS. 4 and 9 can easily be extended to detectors consisting of multiple photosensors by using a composite waveform that is formed by summing the waveforms from each of the photosensors. The summing of the waveforms can include a step of applying a time offset, as determined during a calibration procedure, to each signal, and interpolating to a common timebase before summing. The same delay for each photosensor can be applied for all events or a crystal-dependent delay for each photosensor can be applied, as described in U.S. patent application Ser. No. 12/649,159 to Burr, Gagnon, incorporated herein by reference.

In addition, both of the procedures shown in FIGS. 4 and 9 can be extended to the case where a separate prototype and weighting function are determined for each crystal in detectors that use an array of scintillator crystals. For example, extending the procedure to process a single event in the crystal-dependent case would include using information from each photosensor (i.e., an integrated signal) to determine the crystal of interaction. This procedure would also include creating a composite waveform by summing the waveforms from each photosensor (with a fixed delay for each photosensor, as determined from a calibration procedure, or using a crystal-dependent delay for each photosensor, as described in application Ser. No. 12/649,159.

This process includes an initial step of determining an initial guess for A and t0 for a composite waveform (A can come from the integral of the current waveform relative to the integral of the average waveform and t0 can come from a digital leading edge discriminator "LED").

After determining t0, interpolation is performed to find values of the prototype function on same timebase as the current waveform and a weighting function is calculated for each sample in the timebase of the current waveform.

The penalty function for A and t0 is then calculated and optimization of the estimate of A and t0 (by minimizing the penalty function) is obtained by iteration. Once the penalty function has been minimized, t0 is assigned as the arrival time.

In addition, parameter optimization can be done by reprocessing a set of saved data many times. For example, a large set of coincident waveforms can be acquired and saved to a harddrive. A computer would then re-process the saved data iteratively until optimum parameters were extracted. However, in the case where saving data is not practical and the fitting is available in real-time (in an FPGA in the detector, for example), the parameters can be varied and, for each set of parameters, the timing distribution can be calculated for a newly-acquired set of data. The parameters that result in the narrowest timing distribution would be selected. In this case the optimization process would be controlled by a processor (computer) that is external to the FPGA.

The number of saved waveforms required or processed waveforms will generally be around 1000 or more per prototype function. For example, if only a single prototype function will be used for an entire detector, then approximately 1000 or more events need to be acquired and processed. If, on the other hand, a detector consists of say 169 crystals (a 13×13 array) and there will be a different prototype function for each crystal, then approximately (169*1000=) 169,000 or more waveforms would need to be processed.

Some detector designs allow the depth-of-interaction of the gamma ray within the scintillator to be estimated. This function allows for reduction of parallax error for events occurring away from the center of the radial field of view. Many designs of depth-of-interaction detectors, including dual-end readout detectors and so-called phoswich or pulse-shape discrimination detectors, are known. If the detector allows for an estimate of the depth-of-interaction to be made, then the prototype function can be specifically determined for a certain depth of interaction or a specific crystal position. In this case the crystal array is sub-divided into regions in three-dimensions, not just two, and the detector design allows the depth of interaction to be measured or estimated, and a prototype function based on the crystal of interaction and the depth of interaction is used.

Certain portions of the processing can be implemented using some form of computer processor. As one of ordinary skill in the art would recognize, the computer processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

Figure 10:
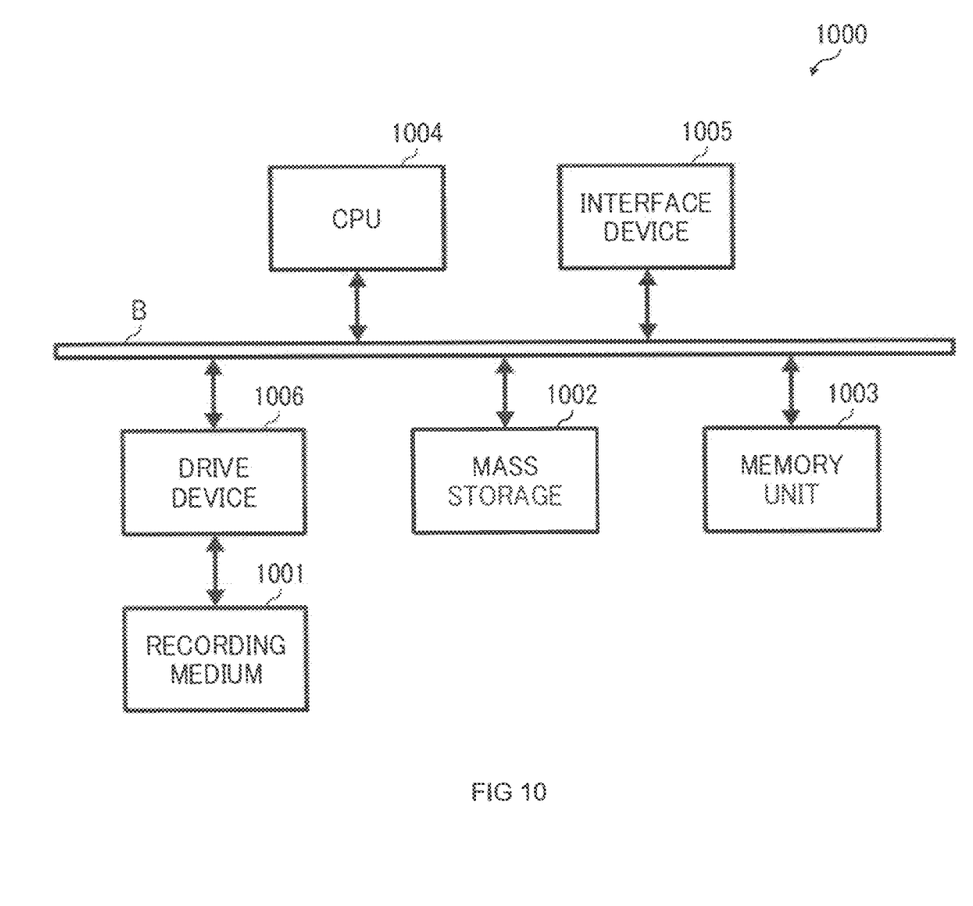
FIG. 10 illustrates an exemplary computer system according to one embodiment.

In addition, certain features of the embodiments can be implemented using a computer based system 1000 shown in FIG. 10. The computer 1000 includes a bus B or other communication mechanism for communicating information, and a processor/CPU 1004 coupled with the bus B for processing the information. The computer 1000 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The computer 1000 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The computer 1000 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the computer 1000 using an appropriate device interface (e.g., small computer system interface (SCSI), integrated device electronics (IDE), enhanced-IDE (E-IDE), direct memory access (DMA), or ultra-DMA).

The computer 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 1000 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer 1000 performs at least a portion of the processing steps of the invention in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multi-processing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

As stated above, the computer 1000 includes at least one computer readable medium 1001 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the main processing unit 1004, for driving a device or devices for implementing the invention, and for enabling the main processing unit 1004 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The computer 1000 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to a mobile device such as a personal digital assistant (PDA) laptop computer, or cellular telephone.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A photosensor-based radiation detection system, comprising:
   a detector having a plurality of photosensors therein, each photosensor being connected to analog-to-digital (ADC) circuitry, the ADC circuitry digitizing analog signals output by the photosensors to generate corresponding digital signals; and
   a processing unit implemented by circuitry and configured to
   determine a prototype function by a determination procedure, and
   determine an arrival time and an amplitude of each of the digital signals by fitting the digital signals to a prototype waveform, derived from the prototype function, the fitting including applying a weighting function that assigns varying importance to different times within the prototype waveform,
   wherein the determination procedure includes
   generating an initial estimate for the prototype function,
   iteratively varying the prototype function,
   calculating a timing resolution value of arrival time differences, and
   determining the prototype waveform by selecting an iteration having a timing resolution value of arrival time differences that falls within a predetermined range.

2. The system according to claim 1, wherein both the prototype waveform and the weighting function are determined empirically during the determination procedure.

3. The system according to claim 2, wherein the prototype waveform is specific for a certain depth of interaction.

4. The system according to claim 2, wherein the prototype waveform is specific for a certain crystal position.

5. The system according to claim 2, wherein the prototype waveform is specific for a certain depth of interaction and a crystal position.

6. The system according to claim 1, wherein the weighting function varies depending on a sampling rate of the ADC circuitry and noise in the system.

7. The system according to claim 1, wherein the determination procedure includes parameterizing an initial prototype waveform and an initial weighting function, and optimizing the parameters via a calibration process.

8. The system according to claim 1, wherein the timing resolution value of arrival time differences is calculated from a plurality of arrival time difference values by applying statistical analysis to the plurality of arrival time difference values.

9. The system according to claim 8, wherein the timing resolution value of arrival time differences is calculated using a standard deviation of a plurality of arrival time difference values.

10. The system according to claim 8, wherein the timing resolution value of arrival time differences is calculated using a full width at half maximum (FWHM) of a plurality of arrival time difference values.

* * * * *